(12) United States Patent
Wang et al.

(10) Patent No.: US 10,698,700 B2
(45) Date of Patent: Jun. 30, 2020

(54) METHOD AND SYSTEM FOR STARTING APPLICATION

(71) Applicant: Alibaba Group Holding Limited, George Town (KY)

(72) Inventors: Tian Wang, Hangzhou (CN); Mingbo Shao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/186,068

(22) Filed: Nov. 9, 2018

(65) Prior Publication Data

US 2019/0095217 A1 Mar. 28, 2019

Related U.S. Application Data

(63) Continuation of application No. PCT/CN2017/079991, filed on Apr. 11, 2017.

(30) Foreign Application Priority Data

May 11, 2016 (CN) .......................... 2016 1 0309803

(51) Int. Cl.
*H04L 29/08* (2006.01)
*H04L 29/06* (2006.01)
(Continued)

(52) U.S. Cl.
CPC ................ *G06F 9/445* (2013.01); *G06F 8/61* (2013.01); *G06F 16/955* (2019.01); *H04L 29/06* (2013.01);
(Continued)

(58) Field of Classification Search
CPC ............ H04N 21/8586; H04N 21/4104; H04L 67/02; H04L 67/28; H04L 67/10; H04L 67/42; H04L 67/141; H04L 67/2814; H04L 67/08; H04L 65/1069; H04L 63/02; H04L 63/04; H04L 63/166; H04L 63/0281; H04L 63/10; H04L 63/168; H04L 69/162; H04L 69/16; H04L 69/329; H04L 41/0893;
(Continued)

(56) References Cited

U.S. PATENT DOCUMENTS 9,330,053 B1 * 5/2016 Bertz ................ G06F 15/17306
9,794,304 B2 * 10/2017 Fallows .................... G06F 9/54
(Continued)

FOREIGN PATENT DOCUMENTS

CN 101516088 8/2009
CN 102970346 3/2013
(Continued)

OTHER PUBLICATIONS

The WebSocket Protocol, Internet Engineering Task Force (IETF), 71 pages (Year: 2011).*
(Continued)

*Primary Examiner* — Thuy Dao
(74) *Attorney, Agent, or Firm* — Fish & Richardson P.C.

(57) ABSTRACT

A first local application starts a websocket and attempts to connect, with the websocket, to a local socket started by a second local application. If the first local application connects to the local socket, stopping a jump to a boot page for downloading the second local application.

15 Claims, 2 Drawing Sheets

(51) Int. Cl.
*G06F 15/16* (2006.01)
*G06F 9/54* (2006.01)
*G06F 9/445* (2018.01)
*G06F 16/955* (2019.01)
*G06F 8/61* (2018.01)

(52) U.S. Cl.
CPC .............. *H04L 29/08* (2013.01); *H04L 67/02* (2013.01); *H04L 67/34* (2013.01); *H04L 67/42* (2013.01); *H04L 69/329* (2013.01)

(58) Field of Classification Search
CPC . H04L 41/5029; H04L 41/0896; H04L 51/00; H04L 51/066; H04L 51/38; H04L 47/14; H04L 69/40; H04L 49/357; H04L 49/557; H04L 45/28; H04L 67/1097; H04L 67/34; H04L 67/2575; G06F 9/445; G06F 16/955; G06F 8/61
See application file for complete search history.

(56) References Cited

U.S. PATENT DOCUMENTS

| | | | | |
|---|---|---|---|---|
| 10,152,590 | B2* | 12/2018 | Liu | G06F 21/53 |
| 2006/0171306 | A1* | 8/2006 | Stout | H04L 69/162 |
| | | | | 370/229 |
| 2010/0229045 | A1 | 9/2010 | Schultz et al. | |
| 2011/0153714 | A1 | 6/2011 | Houben | |
| 2012/0254362 | A1* | 10/2012 | Li | H04W 4/025 |
| | | | | 709/218 |
| 2012/0326851 | A1 | 12/2012 | Xu | |
| 2014/0280694 | A1 | 9/2014 | Bilange | |
| 2016/0337424 | A1* | 11/2016 | Mandyam | H04L 65/4076 |
| 2017/0111322 | A1* | 4/2017 | Patidar | H04L 63/0281 |

FOREIGN PATENT DOCUMENTS

| | | |
|---|---|---|
| CN | 103269396 | 8/2013 |
| CN | 103747074 | 4/2014 |
| CN | 103810033 | 5/2014 |
| CN | 104462478 | 3/2015 |
| CN | 105051685 | 11/2015 |

OTHER PUBLICATIONS

Nicolas et al., Websocket enabler: achieving IMS and web services end-to-end convergence, 3 pages (Year: 2011).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/079991, dated Nov. 13, 2018, 8 pages (with English translation).
European Extended Search Report in European Application No. 17795364.3, dated Feb. 28, 2019, 11 pages.
International Search Report by the International Searching Authority issued in International Application No. PCT/CN2017/079991 dated May 31, 2017; 8 pages.

* cited by examiner

METHOD AND SYSTEM FOR STARTING APPLICATION

CROSS-REFERENCE TO RELATED APPLICATIONS

This application is a continuation of PCT Application No. PCT/CN2017/079991, filed on Apr. 11, 2017, which claims priority to Chinese Patent Application No. 201610309803.4, filed on May 11, 2016, and each application is hereby incorporated by reference in its entirety.

TECHNICAL FIELD

The present application relates to the field of computer software technologies, and in particular, to a method and a system for starting an application.

BACKGROUND

A mobile terminal platform can provide applications developed based on the mobile terminal operating systems, to implement various user-oriented functions. For example, Apple's IOS platform provides mobile terminal applications based on the IOS system, Google's ANDROID platform provides mobile terminal applications based on the Android system, and Windows' mobile terminal platform provides mobile terminal applications based on the Windows system.

The applications on the mobile terminal platform can be started by using other applications. For example, a short message including a URL address is received by a short message application, after the user taps the URL address in the short message, the mobile terminal can open a web page. The opened web page can be opened by using a default browser application of the mobile terminal. For another example, when performing payment transaction, a local application A (for example, a ticket purchase application) on the mobile terminal can open a payment page by using a WebView component integrated in the local application A, so as to start a local application B (for example, a payment application) through the payment page.

Specifically, for example, a certain short message in a short message application of the mobile terminal may include a link to ALIPAY. After the user taps the link in the short message, the mobile terminal can open a page of the link by using a default browser application. Further, the page can attempt to invoke a local application B (for example, ALIPAY) by using a scheme URI, so that the user can perform an operation in ALIPAY. Scheme URI is a system-level resource location method, and supports mobile platform systems such as Android, IOS, and Windows. In the previous example, after invoking ALIPAY, pages opened by browser applications of most mobile platform systems usually do not disappear, but jump to a boot page for downloading an application in a short period of time. As such, even if ALIPAY has already been installed on the mobile terminal, the page that the browser jumps to still prompts the user to download ALIPAY.

For another example, a link to TAOBAO merchandise is opened by operating a local application A of the mobile terminal, for example, the local application A can open a page of the link by using a WebView component. Further, the page can attempt to invoke a local application B (for example, TAOBAO) by using a scheme URI, so that the user can perform an operation in TAOBAO. In the previous example, after invoking TAOBAO, pages opened by WebView components in the local application A of most mobile platform systems usually do not disappear, but jump to a boot page for downloading an application in a short period of time. As such, even if TAOBAO has already been installed on the mobile terminal, the page that is jumped to by using the WebView component still prompts the user to download TAOBAO.

It can be seen that, in the existing technology, after a web page is opened and a corresponding application is invoked, the opened web page cannot learn that the corresponding application has already been installed on the mobile terminal. Therefore, regardless of whether the corresponding application has already been installed on the mobile terminal or not, the mobile terminal is directed to an application downloading page. The communication process is prolonged, resources are wasted, and the user experience is affected.

SUMMARY

The implementations of the present application are to provide a method and a system for starting an application, so that an opened page can confirm that a corresponding application has been installed on a terminal that corresponds to the opened page.

To resolve the previous technical problem, the implementations of the present application are implemented as follows:

A method for starting an application includes: opening, by a first local application, an HTML5 web page, invoking a second local application, and starting websocket to attempt to connect to a local socket; starting, by the second local application, the local socket; and if the first local application connects to the local socket by using the websocket, stopping jumping to a boot page for downloading the second local application.

A system for starting an application includes a first local application, configured to open an HTML5 web page, invoke a second local application, start web socket to attempt to connect to a local socket, and if the first local application connects to the local socket by using the websocket, stop jumping to a boot page for downloading the second local application; and the second local application, configured to start the local socket.

It can be seen from the previous technical solutions provided in the implementations of the present application that, after opening the HTML5 web page, the first local application can start the websocket to attempt to connect to the local socket. The local socket can be started after the second local application is invoked. As such, the first local application can connect to the local socket by using the websocket. If the first local application connects to the local socket by using the websocket, it can be determined that the second local application has been invoked, so that the first local application does not need to jump to a certain download boot page. Further, the first local application can stop jumping to the boot page for downloading the second local application.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings based on these accompanying drawings without creative efforts.

DESCRIPTION OF IMPLEMENTATIONS

Implementations of the present application provide a method and a system for starting an application.

To make a person skilled in the art better understand the technical solutions in the present application, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

In the previous existing technology, a browser application that opens a web page, or a local application A (for example, the previous browser application or ticket purchase application) that opens a web page by using a WebView component is usually not the same application as an invoked local application B, and is not in a same process as the local application B. The existing technology lacks a cross-process communication method in a wake-up process, and the local application A cannot learn that the local application B has been invoked, so that the local application A still jumps to a boot page for downloading the local application B.

Figure 1:
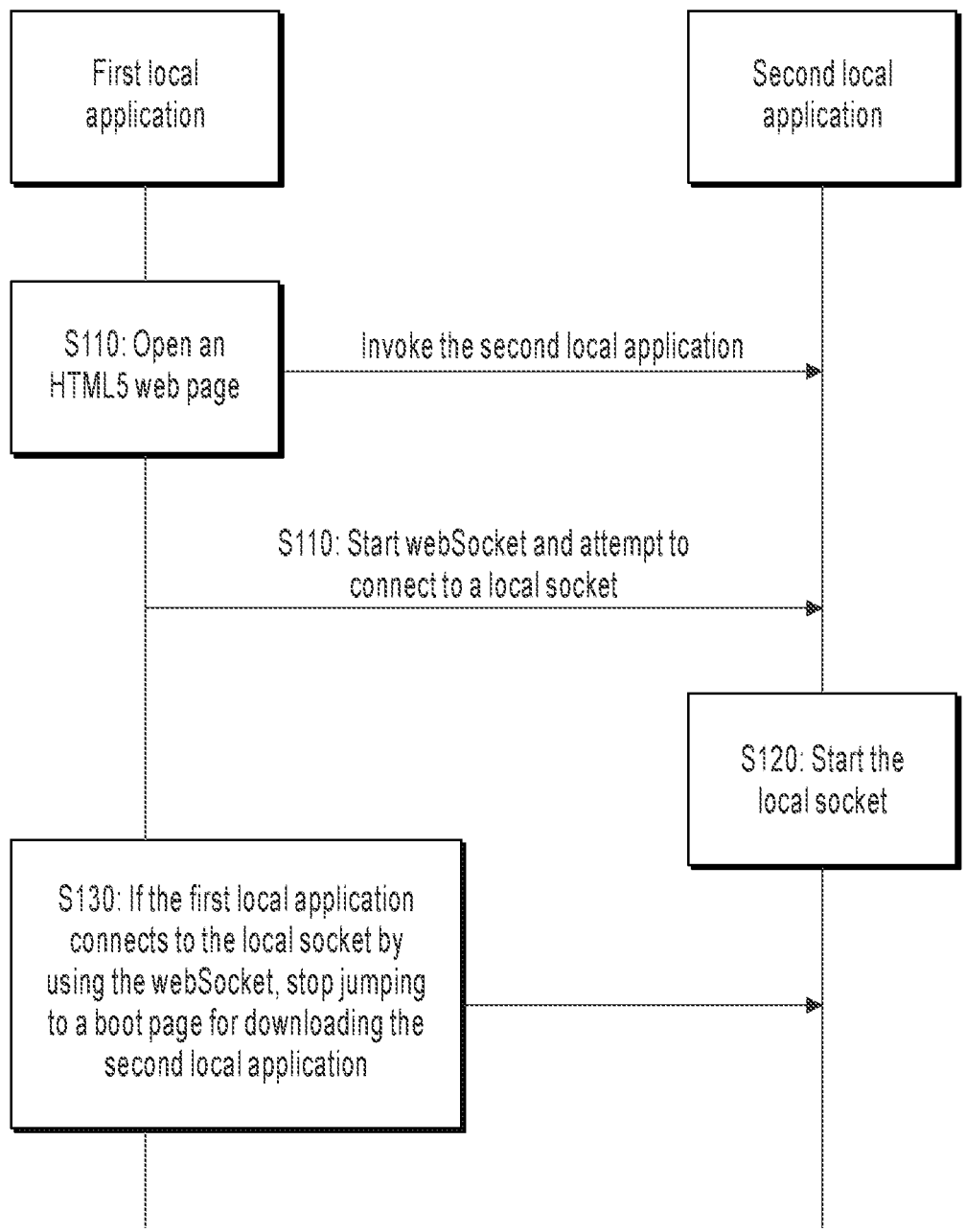
FIG. 1 is a flowchart illustrating an implementation of a method for starting an application, according to the present application.

An implementation of the present application provides a method for starting an application. FIG. 1 shows an implementation procedure of the present implementation. As shown in FIG. 1, the implementation procedure includes the following steps.

S110. A first local application opens an HTML5 web page, invokes a second local application, and starts websocket to attempt to connect to a local socket.

When a link to the HTML5 web page is triggered and opened by an operation such as tapping, the corresponding page can be loaded into a browser application or a WebView component of a local application. The browser application or the WebView component of the local application can assemble the address of the HTML5 web page into a uniform resource identifier (URI). The URI is also referred to as a scheme URI (also URI scheme) or a custom scheme URI. The URI is a naming structure for uniform resource identifier (URI), and can define resources. The resource is a broad concept, and can be a generally called web resource, or can be a file of a local machine, or can be a video on a network, etc. The following forms are URIs:

http://write.blog.csdn.net/postedit/7313543
file:///c:/WINDOWS/clock.avi
Git://github.com/user/project-name.git
ftp://user1:1234@address
ed2k://|file|%5BMAC%E7%89%88%E6%9E%81%E5% 93%81%E9%A3%9E%E8% BD%A69%EF%BC%9A%E6%9C%80%E9%AB% 98%E9%80%9A%E7%BC%89%5D.%5BM ACGAME%5DNeed.For.Speed.Most.Wanted.dmg|40 96933888|2c55f0ad2cb7f6b296db94090b6 3e88e|h=ltcxuvnp24ufx25h2x7ugfaxfchjkwxa|/

The URI scheme generally has the following forms:
scheme://host:[port]/path?queryKey=query Value
scheme is a scheme name, for example, the previous http, file, Git, and ed2k are scheme names; host is a host address; path is a path; queryKey=query Value is a query key value; and port is a port (not mandatory).

For example, there is a short message in a short message application, and content of the short message includes a link in the following form:

http://www.ALIPAY.com/custom.html?schemeUrl=zm Verify%3a%2f%2fschemeApi %2fstartApp%3fbundleId%3d2000118%26version% 3d1.5.1.

zm Verify://schemeApi/startApp?bundleId=2000118&version=1.5.1 is a piece of data in the link, and is also a URI after URL Encode (URL Decode is zm Verify://schemeApi/startApp?bundleId=2000118&version=1.5.1). Zm Verify indicates a Zhima verify APP. For ALIPAY, the data is, for example, ALIPAY://schemeApi/startApp?bundleId=2000118&version=1.5.1. A system can locate, by using the zm Verify scheme, an APP that declares the zm Verify scheme, and invoke the APP. schemeApi, startapp, bundleID, and version are optional parameter items. schemeApi is a domain equivalent to a domain name, such as qq.com, and ALIPAY.com. The second application can process startapp, bundleID, version, or more other similar parameter items based on service requirements, for example, can open a web page, play a piece of music, or send a notification.

After the link in the short message application is triggered and opened, a default browser application can be started, to open the link. In an opening process, a browser application of a terminal device can obtain a URI in the link through parsing, and access a corresponding link resource based on an application identified in the URI. Specifically, the terminal device browser can obtain the URI by parsing js code in web page data.

For example, if the application identified in the URI is ALIPAY, the corresponding ALIPAY APP can be invoked by using a system API, and a resource described in the previous link is accessible in ALIPAY. Similarly, if the application identified in the URI is TAOBAO, the corresponding TAOBAO APP can be invoked by using a system API, and a resource described in the previous link is opened in TAOBAO.

In the previous example, the default browser application is the first local application in S110, and the invoked ALIPAY APP or TAOBAO APP is the second local application.

Similarly, the first local application can be an application integrated with a WebView component, for example, a certain shopping application. The shopping application is integrated with WebView, and a link can be opened by using the application integrated with WebView. Because the WebView component that implements an HTML5 web page browsing function is integrated, the default browser application may not need to be started in the present process.

The first local application and the second local application are usually in different processes, and therefore cannot directly communicate with each other.

In addition, after opening the HTML5 web page, the first local application can further start the websocket and attempt to connect to the local socket. Websocket is a protocol of HTML5. A websocket protocol is defined in HTML5, and can better save server resources and bandwidth, and implement real-time communication. Websocket can implement full-duplex communication between a browser and a server. By using the websocket, the browser and the server need to make one handshake, and then a fast path can be formed between the browser and the server, so that the browser and the server can directly transmit data to each other.

When opening the web page by using the URI, the first local application can obtain an address and a port of the started local socket by using parameters indicated in the URI. As such, the websocket started by the first local application can attempt to connect to the local socket.

S120. The second local application starts the local socket.

In the implementations of the present application, after the second local application is invoked, the second local application can start the local socket. Specifically, when opening the web page by using the URI, the second local application can start the local socket by using parameters included in the URI to instruct to start the local socket. The parameters include, for example, the previous schemeApi, startapp, bundleID, and version. These parameters can be used to indicate content such as an entrance that is opened after the second local application is invoked. For example, ALIPAY is started at the Credit Pay entrance.

The started local socket can be in a "waiting to be connected" state, and can be a service.

The socket is a set of abstract APIs at a communications layer provided by an operating system, is used to describe an IP address and a port, and is a handle of a communications link. An application program sends a request to a network or responds to a network request by using the socket. The application program usually sends a request to a network or responds to a network request by using the "socket". The socket can be used for communication between different processes of the same host, and bidirectional communication can be established.

After an application program (that is, a process) is called by a system and is bound to a certain port, data transmitted by a transport layer to the port is received by a corresponding process, and data sent by the corresponding process to the transport layer is output by using the port.

In addition, after the second local application is invoked, the HTML5 web page corresponding to the link can be opened, so that the user can browse or perform an operation in the second local application.

S130: If the first local application connects to the local socket by using the websocket, stop jumping to a boot page for downloading the second local application.

In S110, after opening the HTML5 web page, the first local application can start the websocket and attempt to connect to the local socket. In S120, the second local application starts the local socket. As such, in S130, the first local application can connect to the local socket by using the websocket.

Based on the websocket communication principle, a handshake mode can be used to communicate with the local socket. Based on confirmation of a handshake success, the websocket can determine that the first local application connects to the local socket.

If the first local application connects to the local socket by using the websocket, it can be determined that the second local application has been invoked, so that the first local application does not need to jump to a certain boot page for downloading the second local application. Further, the first local application can stop jumping to the boot page for downloading the second local application. In addition, because connecting to the local socket by the started websocket is a local operation, and network transmission is not needed or a network response is not needed, processing and determining time can be greatly shortened.

The second local application needs to spend certain time in starting the local socket. Therefore, the first local application does not need to attempt to connect to the local socket after starting the web socket, but can attempt to connect to the local socket after first predetermined duration. In S110, after the first predetermined duration since the HTML5 web page is opened, the first local application can start the websocket, and attempt to connect to the local socket. If the first local application connects to the local socket by using the websocket after the first predetermined duration, the first local application stops jumping to the boot page for downloading the second local application. The predetermined duration is, for example, set to 800 ms or 1 s.

In addition, if the first local application fails to connect to the local socket by using the websocket, the first local application can jump to the boot page for downloading the second local application. Specifically, if the first local application fails to connect to the local socket, the first local application can usually receive an error prompt. As such, if the first local application receives an error prompt when connecting to the local socket by using the websocket, the first local application can jump to the boot page for downloading the second local application. The jumped-to boot page for downloading the second local application can be set in web page logic, and has been implemented in the existing technology, and details are not described again.

The websocket started by the first local application and the local socket started by the second local application can be a specified port or one of a group of specified ports in a web page link, and such a port can be a parameter in the web page link. In a process of assembling a URI, this can also be implemented. As such, the local socket started by the second local application can be a specified port.

In addition, the websocket started by the first local application and the local socket started by the second local application can be a pre-agreed port, or can be one of a group of pre-agreed ports. For example, a port used by the local socket started by the second local application in S120 is one of a group of ports, and the group of ports includes 8888, 8889, and 8890. Sometimes, port 8888 may have been occupied by another application. At this time, the local socket started by the second local application in S120 can find that port 8888 has been occupied, so the local socket can use port 8889. As such, the websocket started by the first local application is also port 8888, and cannot connect to the local socket. Therefore, if the websocket started by the first local application fails to connect to the local socket within second predetermined duration, for example, 20 ms, the first local application can use another port in a predetermined port group to connect to the local socket again. When successfully connecting to the local socket again, the first local application can stop jumping to the boot page for downloading the second local application. If the websocket started by the first local application fails to connect to the local socket in the second predetermined duration after using all ports in the predetermined port group, the first local application can jump to the boot page for downloading the second local application.

The present application further provides an implementation of a system for starting an application.

A system for starting an application includes a first local application, configured to open an HTML5 web page, invoke a second local application, start web socket to attempt to connect to a local socket, and if the first local application connects to the local socket by using the websocket, stop jumping to a boot page for downloading the second local application; and the second local application, configured to start the local socket.

Preferably, when a link to the web page is triggered and opened, the first local application opens the corresponding web page, and the first local application includes a browser application or a local application integrated with WebView component.

Preferably, when the link to the web page is triggered and opened, the first local application assembles the address of the web page into a URI, and invokes the second local application corresponding to the URI.

Preferably, the first local application starts the websocket and attempts to connect to the local socket, including after first predetermined duration since the HTML5 web page is opened, starting, by the first local application, the websocket, and attempting to connect to the local socket.

Preferably, if the first local application fails to connect to the local socket by using the websocket, the first local application jumps to the boot page for downloading the second local application.

Preferably, if the first local application receives an error prompt when connecting to the local socket by using the websocket, the first local application jumps to the boot page for downloading the second local application.

Preferably, when a port used by the second local application to start the local socket is occupied, the second local application uses another port in a predetermined port group.

Correspondingly, if the websocket started by the first local application fails to connect to the local socket in second predetermined duration, another port in the predetermined port group is used to connect to the local socket again.

Preferably, if the websocket started by the first local application fails to connect to the local socket in the second predetermined duration after using all ports in the predetermined port group, the first local application jumps to the boot page for downloading the second local application.

In the 1990s, improvement of a technology can be clearly distinguished between hardware improvement(for example, improvement on a circuit structure such as a diode, a transistor, or a switch) and software improvement (improvement on a method procedure). However, as technologies develop, improvement of many method procedures can be considered as a direct improvement of a hardware circuit structure. Designers almost all program an improved method procedure to a hardware circuit, to obtain a corresponding hardware circuit structure. Therefore, it cannot say that an improvement of a method procedure cannot be implemented by using a hardware entity module. A programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also know that, in addition to implementing the controller by using the computer readable program code, logic programming can be performed on method steps to allow the controller to implement the same function in forms of the logic gate, the switch, the programmable logic controller, the programmable logic controller, and the embedded microcontroller. Therefore, the controller can be considered as a hardware component, and an apparatus configured to implement various functions in the controller can also be considered as a structure in a hardware component. Or the device configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function.

For ease of description, the described apparatus is described by dividing functions into various units. Certainly, when the present application is implemented, the functions of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or another programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or the other programmable data processing device, so that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), and/or a nonvolatile memory, for example, a read-only memory (ROM) or a flash memory (flash RAM). The memory is an example of the computer readable medium.

The computer readable medium includes persistent, non-persistent, removable, and non-removable media that can implement information storage by using any method or technology. Information can be a computer readable instruction, a data structure, a program module, or other data. Examples of a computer storage medium include but are not limited to a parallel random-access machine (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, and a cassette. The cassette storage or another magnetic storage device or any other non-transmission medium can be configured to store information that can be accessed by the computing device. Based on the definition in the present specification, the computer readable medium does not include transitory computer-readable media (transitory media), for example, a modulated data signal and carrier.

It is worthwhile to further note that the terms "include", "comprise", or their any other variants are intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present application are described in a progressive way. For same or similar parts in the implementations, refer to the implementations. Each implementation focuses on a difference from other implementations. Particularly, a system implementation is similar to a method implementation, and therefore, is described briefly. For related parts, refer to related descriptions in the method implementation.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall within the scope of the claims in the present application.

Figure 2:
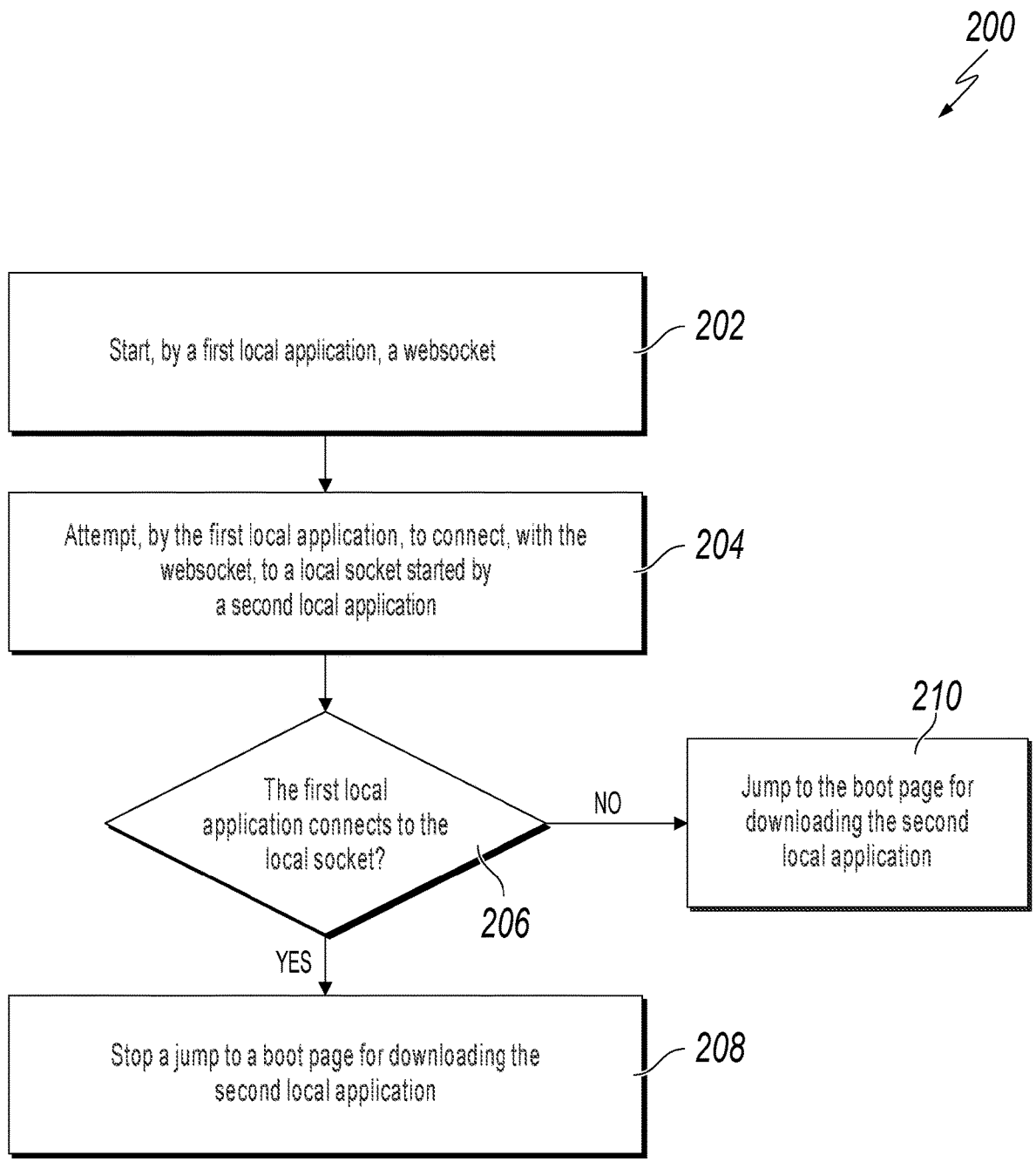
FIG. 2 is a flowchart illustrating an example of a computer-implemented method for starting an application, so that an opened page can confirm that a corresponding application has been installed on a terminal that corresponds to the opened page, according to an implementation of the present disclosure.

FIG. 2 is a flowchart illustrating an example of a computer-implemented method 200 for starting an application, so that an opened page can confirm that a corresponding application has been installed on a terminal that corresponds to the opened page, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a first local application starts a websocket. In some implementations, the first local application comprises a browser application or a local application integrated with a WebView component. In some implementations, when a link to a web page is triggered and opened, the first local application assembles parameters comprising a web page address as a uniform resource indicator (URI) and invokes the second local application corresponding to the URI. In some implementations, the start of the websocket by the first local application and the attempt to connect, with the websocket, to the local socket by the first local application occurs after a predetermined duration of time since the web page is opened. In some implementations, if a port used by the second local application to start the local socket is occupied, another port in a predetermined port group is used. If the websocket started by the first local application fails to connect to the local socket in a predetermined duration of time, another port in the predetermined port group is used to connect to the local socket. From 202, method 200 proceeds to 204.

At 204, the first local application attempts to connect, with the websocket, to a local socket started by a second local application. From 204, method 200 proceeds to 206.

At 206, a determination is made as to whether the first local application connects to the local socket. If the first local application connects to the local socket, method 200 proceeds to 208. Otherwise, method 200 proceeds to 210.

At 208, a jump to a boot page for downloading the second local application is stopped. After 208, method 200 can stop.

At 210, a jump is performed to a boot page for downloading the second local application. In some implementations, if the first local application fails to connect, with the websocket, to the local socket, jumping to the boot page for downloading the second local application. In some implementations, if the first local application receives an error prompt when connecting, with the websocket, to the local socket, jumping to the boot page for downloading the second local application. In some implementations, if the websocket started by the first local application fails to connect to the local socket in the predetermined duration of time after using all ports in the predetermined port group, jumping, by the first local application, to the boot page for downloading the second local application. After 210, method 200 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   starting, by a first local application, a websocket;
   attempting, by the first local application, to connect, with the websocket, to a local socket started by a second local application;
   if the first local application connects, with the websocket, to the local socket, stopping a jump to a boot page for downloading the second local application; and wherein
   if a port used by the second local application to start the local socket is occupied, using another port in a predetermined port group;
   if the websocket started by the first local application fails to connect to the local socket in a predetermined duration of time, using another port in the predetermined port group to connect to the local socket; and
   if the websocket started by the first local application fails to connect to the local socket in the predetermined duration of time after using all ports in the predetermined port group, jumping, by the first local application, to a boot page for downloading the second local application.

2. The computer-implemented method of claim 1, wherein the first local application comprises a browser application or a local application integrated with a WebView component.

3. The computer-implemented method of claim 1, wherein, when a link to a web page is triggered and opened:
   assembling, by the first local application, parameters comprising a web page address as a uniform resource indicator (URI), and
   invoking, by the first local application, the second local application corresponding to the URI.

4. The computer-implemented method of claim 3, wherein the start of the websocket by the first local application and the attempt to connect, with the websocket, to the local socket by the first local application occurs after a predetermined duration of time since the web page is opened.

5. The computer-implemented method of claim 1, further comprising:
   if the first local application fails to connect, with the websocket, to the local socket, jumping to the boot page for downloading the second local application; or
   if the first local application receives an error prompt when connecting, with the websocket, to the local socket, jumping to the boot page for downloading the second local application.

6. A non-transitory, computer-readable medium storing one or more instructions executable by a computer system to perform operations comprising:
   starting, by a first local application, a websocket;
   attempting, by the first local application, to connect, with the websocket, to a local socket started by a second local application;
   if the first local application connects, with the websocket, to the local socket, stopping a jump to a boot page for downloading the second local application; and wherein
   if a port used by the second local application to start the local socket is occupied, using another port in a predetermined port group;
   if the websocket started by the first local application fails to connect to the local socket in a predetermined duration of time, using another port in the predetermined port group to connect to the local socket; and
   if the websocket started by the first local application fails to connect to the local socket in the predetermined duration of time after using all ports in the predetermined port group, jumping, by the first local application, to a boot page for downloading the second local application.

7. The non-transitory, computer-readable medium of claim 6, wherein the first local application comprises a browser application or a local application integrated with a WebView component.

8. The non-transitory, computer-readable medium of claim 6, wherein, when a link to a web page is triggered and opened:
   assembling, by the first local application, parameters comprising a web page address as a uniform resource indicator (URI), and
   invoking, by the first local application, the second local application corresponding to the URI.

9. The non-transitory, computer-readable medium of claim 8, wherein the start of the websocket by the first local application and the attempt to connect, with the websocket, to the local socket by the first local application occurs after a predetermined duration of time since the web page is opened.

10. The non-transitory, computer-readable medium of claim 6, further comprising:
   if the first local application fails to connect, with the websocket, to the local socket, jumping to the boot page for downloading the second local application; or
   if the first local application receives an error prompt when connecting, with the websocket, to the local socket, jumping to the boot page for downloading the second local application.

11. A computer-implemented system, comprising:
   one or more computers; and
   one or more computer memory devices interoperably coupled with the one or more computers and having tangible, non-transitory, machine-readable media storing one or more instructions that, when executable by the one or more computers, perform one or more operations comprising:
   starting, by a first local application, a websocket;
   attempting, by the first local application, to connect, with the websocket, to a local socket started by a second local application;
   if the first local application connects, with the websocket, to the local socket, stopping a jump to a boot page for downloading the second local application; and wherein
      if a port used by the second local application to start the local socket is occupied, using another port in a predetermined port group;
      if the websocket started by the first local application fails to connect to the local socket in a predetermined duration of time, using another port in the predetermined port group to connect to the local socket; and
      if the websocket started by the first local application fails to connect to the local socket in the predetermined duration of time after using all ports in the predetermined port group, jumping, by the first local application, to a boot page for downloading the second local application.

12. The computer-implemented system of claim 11, wherein the first local application comprises a browser application or a local application integrated with a WebView component.

13. The computer-implemented system of claim 11, wherein, when a link to a web page is triggered and opened:
   assembling, by the first local application, parameters comprising a web page address as a uniform resource indicator (URI), and
   invoking, by the first local application, the second local application corresponding to the URI.

14. The computer-implemented system of claim 13, wherein the start of the websocket by the first local application and the attempt to connect, with the websocket, to the local socket by the first local application occurs after a predetermined duration of time since the web page is opened.

15. The computer-implemented system of claim 11, further comprising:
   if the first local application fails to connect, with the websocket, to the local socket, jumping to the boot page for downloading the second local application; or
   if the first local application receives an error prompt when connecting, with the websocket, to the local socket, jumping to the boot page for downloading the second local application.

* * * * *